United States Patent [19]

Pistner

[11] Patent Number: 4,562,925
[45] Date of Patent: Jan. 7, 1986

[54] THERMOPLASTIC BAG, BAG PACK AND METHOD OF MAKING THE SAME

[75] Inventor: Timothy W. Pistner, Fairport, N.Y.

[73] Assignee: Mobil Oil Corporation, New York, N.Y.

[21] Appl. No.: 672,756

[22] Filed: Nov. 19, 1984

[51] Int. Cl.$^4$ .................. B65D 85/62; B65D 30/00
[52] U.S. Cl. .................. 206/554; 206/494;
  206/526; 206/806; 383/8; 383/10; 383/119;
  383/903
[58] Field of Search ............... 206/449, 494, 526, 554,
  206/806; 229/52 AL; 383/8, 10, 119, 120, 122,
  903

[56] References Cited

U.S. PATENT DOCUMENTS

| | | | |
|---|---|---|---|
| 3,485,439 | 12/1969 | Shrum | 383/120 |
| 3,685,643 | 8/1972 | Garshelis | 206/499 |
| 4,476,979 | 10/1984 | Reimann et al. | 383/9 |

FOREIGN PATENT DOCUMENTS

| | | | |
|---|---|---|---|
| 2469355 | 5/1981 | France | 383/8 |

Primary Examiner—William T. Dixson, Jr.
Assistant Examiner—Brenda J. Ehrhardt
Attorney, Agent, or Firm—Alexander J. McKillop; Michael G. Gilman; James P. O'Sullivan, Sr.

[57] ABSTRACT

A thermoplastic bag structure comprising a front and rear bag wall, a bottom and an open mouth top portion, said open mouth portion being characterized by having two pairs of single film handle loops each of which are located at opposite ends of said open mouth portion, the handles of each pair being side-by-side and each handle is an integral single film loop extension of said front and rear bag walls. The bag structures can be unitized by providing a detachable tab at the bag mouth opening and unitizing the bag structures through this tab. The method of forming said bags involves providing an end sealed collapsed thermoplastic film tube and removing plastic to form a bag mouth opening and handles at one end thereof. The resulting bag is an ungussetted bag which can be unitized into a pack by providing a detachable, unitizing tab at the bag mouth opening.

7 Claims, 4 Drawing Figures

THERMOPLASTIC BAG, BAG PACK AND METHOD OF MAKING THE SAME

This invention is concerned with a thermoplastic handled sack, a plurality of said sacks unitized into a bag pack and a method for preparing the same.

BACKGROUND OF THE INVENTION

Handled thermoplastic sacks are well known and are finding increasing use in the grocery sack market. Far and away the most common type of thermoplastic handled grocery sack is one made from a gussetted tube sealed at the top and the bottom with a suitable bag mouth and handle cutout, which yields a double layer of film in the handled region. There are two problems associated with this type of bag. One problem is the fact that the gusset folds of the bag are of necessity trapped in the bottom seal of the bag. This prevents the gusset from extending fully as product is loaded into the bag, which results in a wasteful loss of volume. The other problem is that where there are transitions from four-layers to two-layers along the heat-seal line of the bottom of the bag and forces are brought to bear at these transition points, as the bag attempts to expand, tears develop on both sides of the bag at the transition points.

It is an object of the present invention to provide a bag and a method of making the same which bag will have maximum volumetric efficiency.

It is a further object of the present invention to provide maximum volumetric efficiency in a handled thermoplastic bag without sacrificing bag strength in the handled region of the bag.

SUMMARY OF THE INVENTION

The present invention is directed to a method for forming a thermoplastic film handled sack comprising:

(a) forming a collapsed thermoplastic film tube, heat-sealed transversely at each end thereof;

(b) folding opposite sides of the sealed tube toward but spaced from each other, along lines perpendicular to said heat-seals; and (c) removing, from one end of the folded structure, film regions sufficient to form a bag mouth opening and a pair of single layer handle loops at opposite ends of said bag mouth opening.

The invention is also directed to a method for forming a unitized pack of thermoplastic film handled sacks comprising:

(a) forming a collapsed thermoplastic film tube, heat-sealed transversely at each end thereof;

(b) folding opposite sides of the sealed tube toward but spaced from each other, along lines perpendicular to said heat-seals;

(c) stacking a plurality of such folded structures one upon the other in registration; and (d) simultaneously performing a cutting, perforating and unitizing operation at one end of the stack that will form a pair of single-layer loop handles with bag mouth opening therebetween and tab members, attached by way of film perforations to the edges of said bag mouth opening, said tab members being unitized, thereby forming said pack of sacks.

The invention is further directed to a thermoplastic bag structure comprising a front and rear bag wall, a two-film heat seal bottom and an open-mouth top portion, said open mouth portion beinhg characterized by having two pairs of single film handle loops each of which are located at opposite ends of said open mouth portion, the handles of each pair being side-by-side and each handle being an integral looped extension of said front and rear bag walls. It is preferred that the open mouth top portion of the bag have arcuate stress relief regions at the base of the innermost handles and that the upper edges of the mouth extend above these stress relief regions.

The invention is further directed to a pack of thermoplastic film bags comprising: a plurality of superimposed bag structures each having a front and rear bag wall, a two film heat sealed bottom and an open mouth top portion, said open mouth portion being characterized by having two pairs of single film handle loops located at opposite ends of said open mouth portion, the outer side region of each bag being folded toward each other so that the handles of each handle pair are in registration; tab members detachably attached to the upper edges of said bag mouth; and said tabs being unitized to hold said superimposed bag structures together in a pack.

DETAILED DESCRIPTION OF THE INVENTION

It is well known in the plastics art to continuously melt extrude thermoplastics through an annular orifice, apply internal fluid pressure to the tube thus extruded and thereby expand the tube and reduce the wall thickness thereof to appropriate dimensions while cooling and solidifying the extruded thermoplastic film. This technique and any equivalent technique of forming a thermoplastic film tube, can be employed in providing the starting material for the bags and bag packs of the present invention.

The contemplated thermoplastic film can be of any type having the characteristics necessary for a handled bag which will be required to carry items totaling up to 45 lbs. or more. While not limited to the polyolefins, these materials have proven in the past to be excellent films from which bags can be made. Preferred materials include polyethylene generically and, specifically, low density polyethylene, high density polyethylene, including high molecular weight, high density polyethylene, linear low density ethylene copolymerized with a $C_3$–$C_8$ alpha olefin and blends and mixtures of the same. A specific example of a commerically available polyethylene material suitable for use in the present invention is a linear low density ethylene copolymerized with from about 2 to about 7 wt.% of octene-1.

Figures 1, 2:
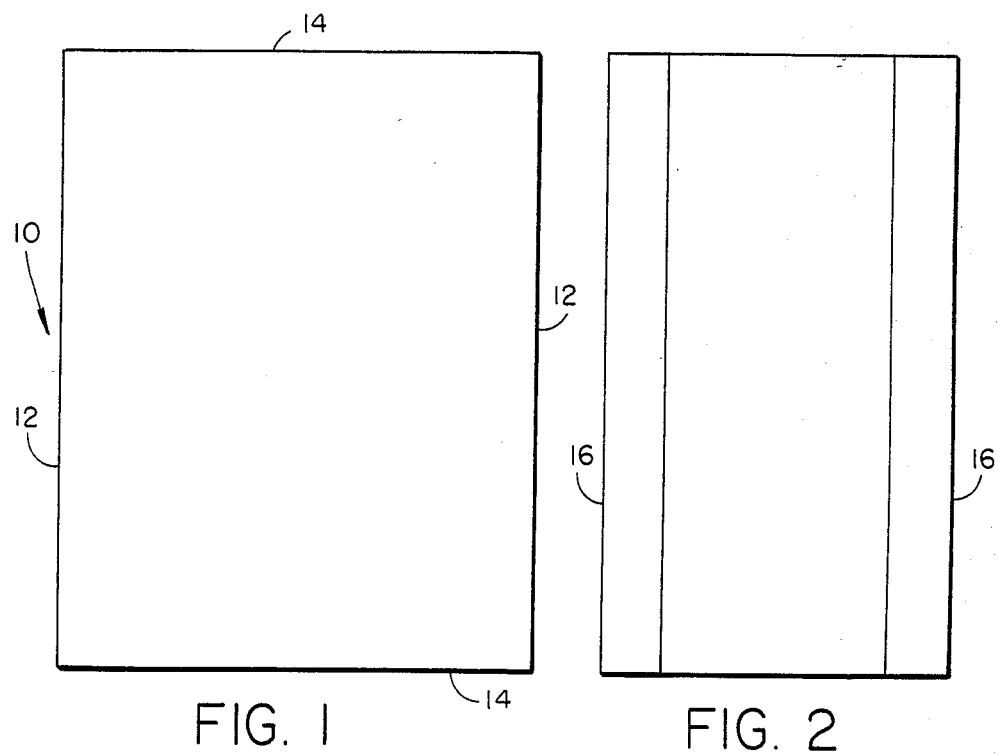
FIG. 1 is a plan view of a collapsed end sealed thermoplastic tube.
FIG. 2 is a plan view of the tube of FIG. 1 with the sides folded toward each other.

This linear low density ethylene-octene-1 copolymer, i.e. LLDPE, is melt extruded through an annular orifice and blown up to a tube which will have a lay flat diameter of approximately 19.5 inches. This tube is then collapsed and formed into heat-sealed segments approximately 25 inches long. This will produce what is known as a sealed "pillow case" 10, as shown in FIG. 1. The sides 12 are seamless and the ends 14 are heat-sealed. Heat-seal 14 constitutes a thermal merging of the two-films of the collapsed tube. The seals 14 can be made so that they simultaneously seal and sever-through the films or the seals may be made not to sever-through but merely weaken the region adjacent to line 14 so that they may subsequently be severed with comparatively little force. This latter technique is preferred because the next step in the process calls for folding over the seamless sides of the tube, as shown at 16 in FIG. 2. The folded-over region 16 can be of varying width. The degree of foldover is related to the ultimate thickness of the handles and width of the bag mouth opening. Employing a layflat tube having a side-to-side dimension of approximately 19.5 inches, the individual handle widths can range anywhere from about 1 to 4 inches, preferably from about 1½ to 3 inches.

In forming the bags contemplated by the present invention, a plurality of the side folded structures, shown in FIG. 2, are stacked in registration and by use of a suitable cutting mechanism the handles and bag mouth opening are formed by removal of plastic film from one end of the stack. If a simple bag structure is desired, where only individual bags are formed, a cutting member defining a broad U can strike out this configuration at one end of the stack of bags. Simultaneously, in the upper left and upper righthand regions of the stack, a somewhat half parabolic cutter can remove plastic film of the corresponding configuration, so as to provide hand-access to the resulting handles.

Figures 3, 4:
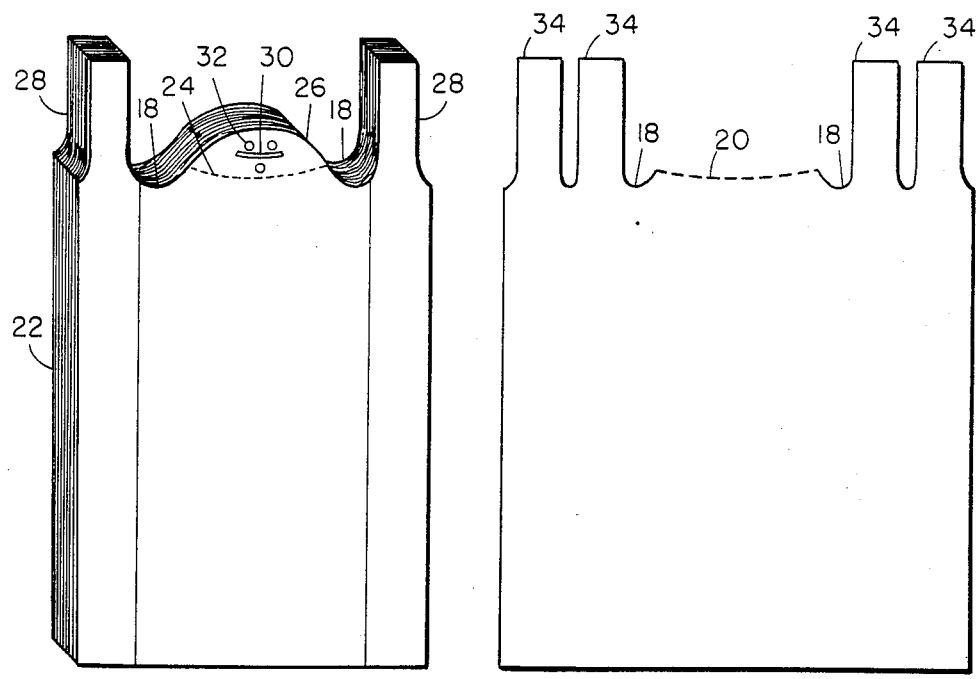
FIG. 3 is an isometric view of a unitized stack of bags of the type described herein.
FIG. 4 is a plan view of a single detached bag in its unfolded condition.

Referring to FIG. 3, there is shown a stack of bags having handles and bag mouth opening of a more complex design. The handles and bag mouth opening show that at the base of the handles there are stress-relief regions 18 which function to cause stress forces which ordinarily would be brought to bear along bag mouth line 20 (see FIG. 4) to concentrate at points below this line. The stress forces will literally extend through the film space between the bottom of the arc of stress relief regions 18. Bag mouth opening 20 is the consequence of removing an individual bag from the bag pack 22 of FIG. 3 by tearing the same along perforation line 24 of FIG. 3. Even where the connecting points between tab 26 and the bag proper are few in number, in the absence of stress-relief regions, such as that illustrated at 18, tears tend to initiate somewhere along the edge of the bag mouth opening.

As indicated above, the device which forms the handles and bag mouth opening can also perform several other functions simultaneously, for example, forming detachable bag tabs.

It is necessary in order to accommodate the carrying hand of the user to open the upper left and right sides of the structures as at 28. This is accomplished by providing for a cutting member which will remove a hand accommodating slice from each bag structure. As with the portion removed from the region between handles, the portion removed can be returned for recycle as useable resin material.

In forming a unitized pack of bags, such as is illustrated in FIG. 3, the tab member 26 can be designed to have sufficient film area so that an orifice 30 can be formed therein. Orifice 30 functions to permit the unitized stack of bags to be suspended from a suitable holding member which will accommodate dispensing of the bags.

A suitable bag pack holding and dispensing device is described in U.S. Pat. No. 4,062,170. This patent is incorporated herein in its entirety by reference. The bag pack of FIG. 3 can be utilized with this dispenser rack by suspending the pack from orifice 30 by placing the same around the tongue or holder member of the rack of the above-identified patent. A plurality of individual bags of the pack of FIG. 3 are unitized together by one or more heat sealed regions 32 fused completely through all of the tabs 26 of the bag structures. FIG. 3 shows three heat fused regions 32, two above orifice 30 and one below. A convenient manner of forming these heat fused region is by employment of an ultrasonic plastic welding device. If the bag pack is to be employed with a dispensing rack of the type defined in the above-identified patent then after suspension of the pack from orifice 30 the handles are unfolded and the loops thereof are spread open and about the ears of the rack. During this operation an individual bag is torn free of the tab along the perforation line 24. The bag is then conveniently in a proper position for loading with purchased goods. It will be seen that a bag of this structure makes maximum use of the potential volume of the original collapsed cylinder. The ungussetted structure does not have regions predisposed to tear in the bottom of the bag, i.e. a trapped four-layer gusset. At the same time, the two pairs of handles 34 provide four loops of film to more than adequately support a heavily loaded bag structure.

It should be evident that various other modifications can be made to the described embodiment without departing from the scope of the present invention.

What is claimed is:

1. A thermoplastic bag structure comprising a front and rear bag wall, a bottom and an open mouth top portion, said open mouth portion being characterized by having two pairs of single film handle loops each of which are located at opposite ends of said open mouth portion, the handles of each pair being side-by-side and each handle being an integral looped single film extension of said front and rear bag walls.

2. The bag structure of claim 1 wherein said open mouth top portion has arcuate stress relief regions at the base of the innermost handles and the upper edges of said mouth extend above said stress relief regions.

3. The bag structure of claim 2 having 2-film heat seals at the bottom of said bag and at the tops of said handles and seamless bag sides.

4. A pack of thermoplastic bags comprising: a plurality of superimposed bag structures as defined in claim 2, the outer side regions of each bag being folded toward each other so that the handles of each handle pair are in registration; tab members detachably attached to the upper edges of said bag mouth; and said tabs being unitized to hold said bags together in a pack.

5. The pack of claim 4 wherein said tabs are unitized by heat-welding.

6. The pack of bags as in claim 5 wherein said tab also includes means accommodating physical support of said pack.

7. The pack of claim 6 wherein said support-accommodating means is at least one orifice.

* * * * *